(No Model.)
W. C. HERRIMAN.
END GATE AND FASTENING DEVICE THEREFOR.
No. 563,173. Patented June 30, 1896.
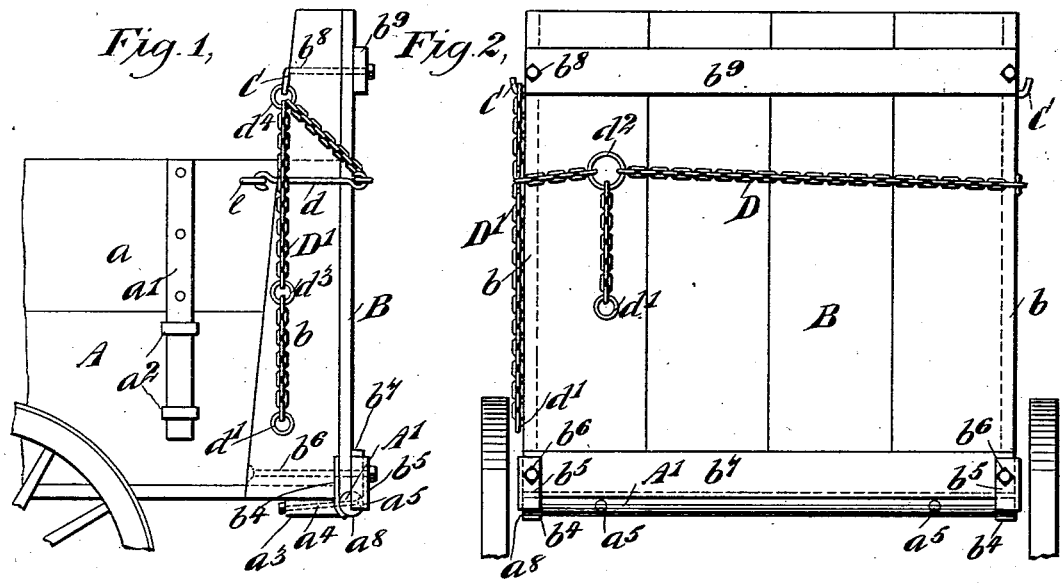
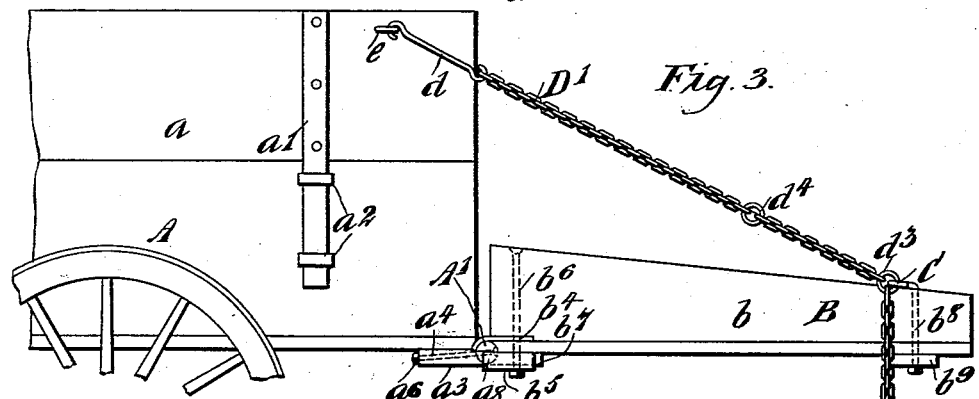
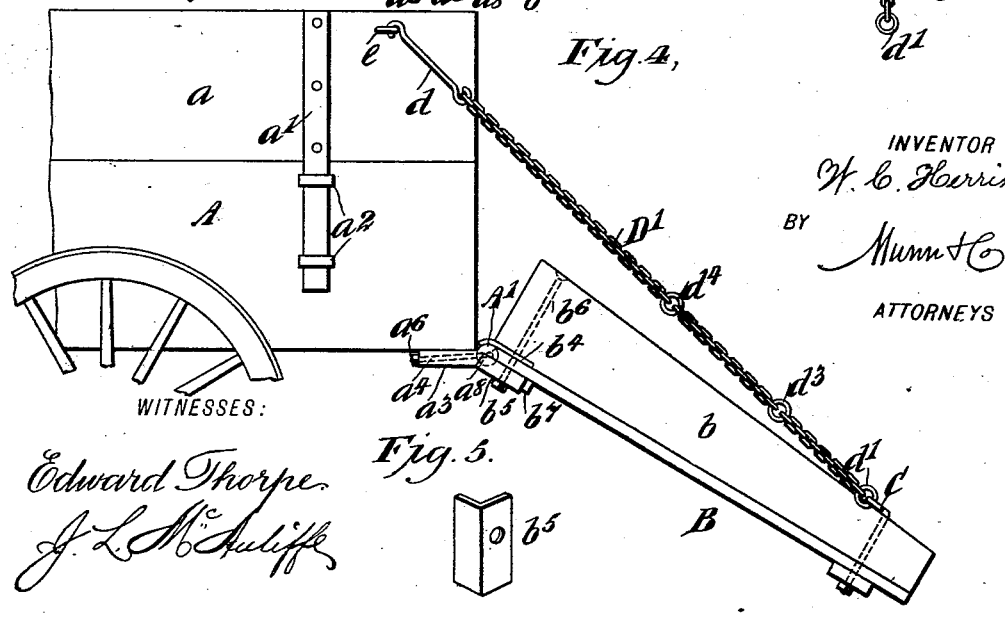
WITNESSES:
Edward Thorpe
J. L. McAuliffe
INVENTOR
W. C. Herriman
BY
Munn & Co
ATTORNEYS

UNITED STATES PATENT OFFICE.

WILLIAM C. HERRIMAN, OF ROADS, MISSOURI.

END-GATE AND FASTENING DEVICE THEREFOR.

SPECIFICATION forming part of Letters Patent No. 563,173, dated June 30, 1896.

Application filed December 19, 1895. Serial No. 572,669. (No model.)

*To all whom it may concern:*

Be it known that I, WILLIAM C. HERRIMAN, of Roads, in the county of Carroll and State of Missouri, have invented a new and Improved End-Gate and Fastening Devices Therefor, of which the following is a full, clear, and exact description.

The invention is especially designed as an improvement in the end-gates of wagons adapted to carry grain, as well as pigs and other stock; and the object of the invention is to provide an end-gate which, when fastened in place, will afford a substantial brace for the end of the wagon-body to prevent injurious shaking of the body when being drawn over rough roads; to provide an end-gate which may be readily and securely fastened in the closed position, and which may be readily lowered and properly secured in position for the ready unloading of grain without injuring the bottom of the body, and which may be fastened in a further lowered position to form a runway, as to a hog-chute or the like. When used for hauling stock, it can be raised or lowered speedily and conveniently while the wagon is backed, and while remaining against the stock-chute.

The invention consists in the novel features hereinafter particularly described, and defined in the claims.

Reference is to be had to the accompanying drawings, forming a part of this specification, in which similar characters of reference indicate corresponding parts in all the views.

Figure 1 is a fragmentary side view of a wagon having an end-gate and fastening devices therefor embodying my invention, the gate being shown closed. Fig. 2 is a rear end view. Fig. 3 is a side view similar to Fig. 1, but with the end-gate lowered and secured in position for the unloading of grain. Fig. 4 is a side view similar to Fig. 3, but with the gate lowered to form a runway for live stock; and Fig. 5 is a detail perspective view of an iron secured to the end-gate.

The wagon A in the present instance has the upper part $a$ of the body removably held to the lower part by arms $a'$, that are received in keepers $a^2$ in the usual manner to provide a deep body adapted for grain or hogs. To the rear end of the body, and to rear sill of same, is bolted a round bar A', the connection being effected by bolts $a^4$, which pass through the round bar A' and the sill $a^3$ in a slightly diagonal direction, as best seen in Figs. 1 and 3, and the inner ends of the bolts are provided with nuts $a^6$, that engage the rear sill $a^3$, while the outer ends or heads $a^5$ of the bolts are countersunk in the bar A'. The round bar A', it will be seen, is thus secured in place substantially flush with the upper surface of the wagon-bottom and forms a tight joint between the wagon-bottom and the end-gate.

To the bottom of the end-gate B at each end there is secured a hooked plate $b^4$, which engages and hooks over the end $a^8$ of the bar A', and prevents sidewise displacement of the end-gate. Angle-irons $b^5$ may be provided adjacent the hooked plates $b^4$ on the opposite side of the end-gate for engaging the bar A'. The hooked and pivotal engagement of the end-gate with the ends of the bar A' thus permits of the proper pivotal movement of the end-gate. The end-gate B further has forwardly-extending side members $b$, that extend outside of the sides of the body A when the end-gate is closed. At the bottom of the end-gate the corners are strengthened by bolts $b^6$, passing through the side members $b$; also through the irons $b^4$ $b^5$, and through a sill or cleat $b^7$, secured at the bottom of the gate under the angle-irons $b^5$.

At the upper end of the end-gate B hooks C are secured, said hooks inclining downwardly and opening rearwardly when the gate is in the open or extended position. In the instance shown the hooks C are produced on rods $b^8$, passing through the side members $b$ and through the upper sill $b^9$ and secured by a tap. On the body A, near the top, suitable staples $e$ or like devices are provided, and in connection with said staples and the hooks C, chains D D', having link-bars $d$, are employed for securing the end-gate in the closed position and for supporting it horizontally for the discharge of grain, or below the horizontal to form an inclined runway for hogs or other stock. Thus, the chains D D' and their link-rods $d$ have such a length that the enlarged eyes or rings $d'$, at the extreme outer ends of the chains, when the said eyes are engaged with the hooks C, will support the end-gate in the position shown in Fig. 4, that is, in position to form an inclined chute for hogs or other stock. Each chain further has a ring $d^2$ $d^3$ at such a distance from the end of the chain as will engage the hooks C and support the end-gate in the horizontal position, as in Fig. 3, for enabling grain to be scooped out of the wagon, and by the provision of the joint made by the end-gate and bar A' the grain may be scooped out without injuring the bottom of the body with the shovel. It will be seen that the ring $d^2$ of the chain D is larger than the corresponding ring $d^3$ of the other chain, D', and also that the chain D' has an additional ring $d^4$ at a point inward from its ring $d^3$. With this construction it will be seen that to fasten the end-gate in the closed position the link-rods $d$ of the chains are engaged with the staples $e$ of the body, the chain D' is passed through the eye $d^2$ of chain D, and the two chains drawn taut, after which the inner ring $d^4$ of chain D' is hooked over the hook C, adjacent thereto, all as will be clear from an inspection of Figs. 1 and 2. Thus the end-gate is securely fastened and may be quickly lowered and secured in either of the lowered positions. In the fastened position the end-gate, it will be seen, forms a firm brace for the sides of the body and prevents injurious jarring.

Having thus described my invention, I claim as new and desire to secure by Letters Patent—

1. The combination with a wagon-body, of an end-gate, and hooks and fastening devices for the end-gate, comprising two chains having rings at the outer ends, rings inward from the ends, one of said rings being smaller than the other, and a third ring on the chain having the said smaller ring, and means for securing the inner end of each chain, substantially as described.

2. The herein-described end-gate, having hooks and fastening devices therefor comprising two chains having rings at the outer ends, rings inward from the ends, one of the latter rings being smaller than the other, and a third ring on the chain having the said smaller ring both of the chains having link-rods at their inner ends, substantially as described.

3. The herein-described end-gate, having hooks inclined downward and opening rearwardly, and fastening devices therefor comprising two chains having rings at the outer ends, rings inward from the ends, one of the latter rings being smaller than the other, and a third ring on the chain having the said smaller ring, both of the chains having link-rods at their inner ends, substantially as described.

4. The herein-described end-gate, having a hook at each side near the top, and chains having link-rods at their inner ends for connection with a wagon-body, the chains further having eyes or rings at their ends, said end rings when engaged with the hooks serving to support the end-gate below the horizontal position, to form an inclined chute, and eyes or rings such a distance inward from the ends as will engage the said hooks when the end-gate is in the horizontal position, substantially as described.

WILLIAM C. HERRIMAN.

Witnesses:
W. C. O'NEALL,
E. L. BRATIE.